United States Patent [19]

Matthes

[11] 4,331,524

[45] May 25, 1982

[54] PROCESS AND APPARATUS FOR ELECTROLYTIC METAL PROCESSING

[75] Inventor: Hans Matthes, Wermelskirchen, Fed. Rep. of Germany

[73] Assignee: AEG-Elotherm, G.m.b.H., Remscheid-Hasten, Fed. Rep. of Germany

[21] Appl. No.: 149,557

[22] Filed: May 13, 1980

[30] Foreign Application Priority Data

Nov. 3, 1979 [DE] Fed. Rep. of Germany ....... 2944505

[51] Int. Cl.³ .......................... B23P 1/02; B23P 1/12; B23K 9/16
[52] U.S. Cl. ........................ 204/129.25; 204/129.43; 204/224 M; 204/225; 204/228; 219/69 S
[58] Field of Search ........... 204/129.2, 129.25, 129.43, 204/224 M, 225, 228; 219/69 C, 69 S

[56] References Cited

U.S. PATENT DOCUMENTS

| | | |
|---|---|---|
| 3,617,680 | 11/1971 | Grosskopf ........................ 219/69 S |
| 3,673,371 | 6/1972 | Smith et al. .................... 219/69 S X |
| 3,749,877 | 7/1973 | Lobur ................................ 219/69 S |
| 3,825,713 | 7/1974 | Bell, Jr. ........................ 219/69 S X |
| 3,884,790 | 5/1975 | Kobayashi et al. ............ 204/224 M |
| 4,242,555 | 12/1980 | Delpretti ....................... 219/69 S X |

FOREIGN PATENT DOCUMENTS

| | | | |
|---|---|---|---|
| 41-10962 | 10/1962 | Japan ............................... 204/129.2 |
| 250636 | 10/1971 | U.S.S.R. ......................... 204/129.25 |
| 339381 | 8/1972 | U.S.S.R. ......................... 204/224 M |
| 347144 | 8/1972 | U.S.S.R. ......................... 204/224 M |

Primary Examiner—Delbert E. Gantz
Assistant Examiner—Donald R. Valentine
Attorney, Agent, or Firm—Cushman, Darby & Cushman

[57] ABSTRACT

A method and apparatus for electrolytic processing of a metallic workpiece in which short circuits in the operating gap which produce an arc are detected and extinguished by an auxiliary d.c. current of limited duration and counter to the direction of flow of the operating current without withdrawing the electrode or cutting off the operating current.

16 Claims, 2 Drawing Figures

PROCESS AND APPARATUS FOR ELECTROLYTIC METAL PROCESSING

The invention relates to a process for the electro-chemical processing of a metallic workpiece, an apparatus for carrying out this process and an apparatus for the electro-chemical processing of a metallic workpiece.

An apparatus for electro-chemical metal processing of the kind accomplished by the present invention has been known (cf. British Pat. No. 944,613). In this apparatus, in case of a short circuit between the processing electrode and the workpiece to be processed, the feed of the operation gap with d.c. operating current is interrupted and the processing electrode is moved back from the short circuit position by means of its driving motor. The flushing of the operating gap with the liquid electrolyte is increased thereby and the cause of the short circuit is extinguished. After that, the operating electrode is again moved forward by means of its driving motor into its original operating position and the operating process is continued by switching the d.c. current source on again.

Because of the power stored electrically and/or magnetically in the operating circuit of the metal processing apparatus, which despite switching off the source of operating current in the case of a short circuit may lead to destruction or damage in the operating gap, it has been known to connect one or several electric switches in parallel to the operating gap, which, when operated in case of a short circuit by the short circuit detector will close a relief circuit. The inside resistance of this relief circuit is selected to be small as compared to the inside resistance in the operating circuit so that the magnetic and electric power stored in the operating circuit may be carried off via the relief circuit.

It has also been known (cf. U.S. Pat. No. 3,617,680) to provide a second auxiliary circuit in parallel to the operating gap and in parallel to the direct current source beside the relief circuit containing the short circuit device, for the improvement of the deflection of the short circuit current to the relief circuit, which second circuit contains a current source developed in the form of a capacitor. The current source is connected into the second auxiliary current circuit by means of a transformer, and in case of a short circuit is opened by means of a thyristor switch. As a result, a temporally decreasing impulse-like auxiliary voltage becomes active, which is in contact with the operating gap and drives the short circuit current via the relief circuit switched in parallel.

These arrangements have the disadvantage that in case of a short circuit processing imprecisions occur on the workpiece to be processed. The imprecisions may be recognized for example, as wave-shaped unevennesses in a flat surface. These unevennesses are to be traced back to imprecisions in the repositioning of the processing electrode, which in case of a short circuit is moved back from its operating position into a short circuit position and after elimination of the cause for the short circuit is again moved forward into the processing position in order to continue the processing procedure and is to be traced back to positioning errors of the positioning mechanism which adjusts the processing electrode. One will not succeed in precisely reproducing the original processing position of the processing electrode in case of a short circuit.

Hitherto not much attention was paid to such processing errors. This invention deals with the task of reducing the processing errors occuring in case of a short circuit and reducing the time expenditure in repositioning.

In the process of the invention an extended interruption of the operating process from a short circuit may be avoided by sending an auxiliary current counter to the direction of flow of the operating current across the operating gap in case of an arc, which extinguishes the occurring arc. Thereby damage to the workpiece or to the processing electrode by the arc will be avoided and the interruption of operating process by switching off the d.c. feed and return of the processing electrode into an operating position will be avoided.

Practical experience has indeed shown that a considerable part of the short circuits occurring in practical operations occur while forming an arc standing in the operating gap of the device. In case of the occurrence of one or several arcs in the operating gap, it will be sufficient to extinguish the arcs and to continue the work process sending the auxiliary direct current extinguishing the arc (or arcs) repeatedly across the operating gap is effective.

In case of the occurrence of "dead" short circuits, i.e., short circuits with metallic contact between the processing electrode and the workpiece, one may proceed according to the invention in the customary manner, i.e., with interruption of the operating process by return of the processing electrode and switching off of the direct current feed.

A considerable part of the short circuits occurring in practice takes place with formation of an arc between the processing electrode and the workpiece. With the use of the process of the invention it will therefore be possible to reduce the influence of these cases of interference to precision processing of the workpiece.

In a development, a process of this type is proposed where in case of the occurrence of short circuits which form no arc, the direct current feed of the operating gap from the direct current source is interrupted and the processing electrode is adjusted by means of its driving motor with enlargement of the operating gap by reversal of the feed direction of the electrode drive and in case of which, after switching off of the direct current feed, a temporally limited short circuit current flows across the operating gap. In case of a short circuit free of an arc, an auxiliary direct current source is connected to the operating gap, counter to the direction of the current flow of the direct operating current to drive an auxiliary current of temporally limited duration across the operating gap for compensation, or at least partial compensation, of the short circuit current.

In case of proceeding that way, short circuit currents existing upon occurrence of dead short circuits are compensated, or in any case reduced, to the point where damage is avoided.

For carrying out the process of the invention, an arrangement is disclosed consisting of an electrolytic processing apparatus with a workpiece to be processed, a processing electrode adjustable as against the workpiece by means of a driving motor, a direct current source connected to the operation gap filled with a liquid electrolyte and formed by the workpiece and the processing electrode, an auxiliary current source connectable to the operating gap, for the production of an auxiliary direct current of temporally limited duration and with a detector device for the determination of the short circuit on the operating gap. The starting signal of the detector device switches the auxiliary direct current source, which drives via the operating gap counter to the direction of flow of the operating direct current an auxiliary direct current of temporally limited duration. The detector device is developed sensitive selectively to short circuit processes running their course with the formation of arcs.

The detector device may act for this purpose for example, by detecting light or high frequency vibrations occurring with the formation of arcs.

Preferably, in addition to the detector device, responding selectively to short circuit processes taking place with formation of arcs, a second detector device is provided which responds selectively to short circuits taking place without arcs. The starting signal of the second detector device switches off the direct current source and reverses the driving motor.

Furthermore, the starting signal of the second detector device preferably serves to connect an auxiliary power source in parallel to the operating gap, which counter to the direction of current flow of the operating direct current drives an auxiliary direct current of temporally limited duration.

The arrangement may be such that the intensity and/or duration of the auxiliary direct current may be adapted automatically to the expected conditions in the operating gap.

At the same time the auxiliary direct current source consists of several capacitors, chargeable by means of a charging circuit and connectable via switches in parallel. The capacitors may be disposed in equalizing circuits, which always have a variable equalizing time constant, so that the individual capacitors, according to need, may serve either individually as a power source for the production of variably long auxiliary currents or with superposition of their charges for the production of auxiliary direct currents of variable duration, form and intensity.

The form of the pertinent auxiliary direct current at the same time is to be adapted to the course and duration of the short circuit to be expected at the operating gap. The course and duration of the pertinent short circuit current may be defined at least approximately from the construction of a pertinent device for the feeding of direct current of the operating gap and from the time of occurrence of the short circuit, so that the form or the duration and the intensity of the auxiliary direct current may be selected correspondingly.

Furthermore, a processing electrode is preferably movable against the workpiece to be processed by means of a servomotor, with an operating gap enclosed by the processing electrode and the workpiece to be processed, with a direct current source connectable to the operating gap, with a detector device for determining short circuits connectable to the operating gap and with switching means for the connection of the direct current source and the servomotor, operable by the detector device, in case of which a single equalizing circuit is provided in parallel to the operating gap, which contains switching means which close the equalizing circuit via the detector device. The equalizing circuit contains an auxiliary direct current source which drives a pulse-like direct current of temporally limited duration.

The arrangement is effectively dimensioned such that the auxiliary direct current source, which is also connected to the terminals of the direct current source, takes over the short circuit current of the operating circuit in case of a short circuit and thus protects the processing electrode or the workpiece to be processed against damage.

The arrangement proposed has the advantage that special auxiliary direct current circuits for the deflection of the short circuit current from the operating gap to the equalizing circuit become dispensable and in that an equalization of the operating gap occurs despite the very low resistance in the operating direct current circuit in case of a short circuit.

The attached drawings serve for the explanation of two embodiments.

Figure 1:
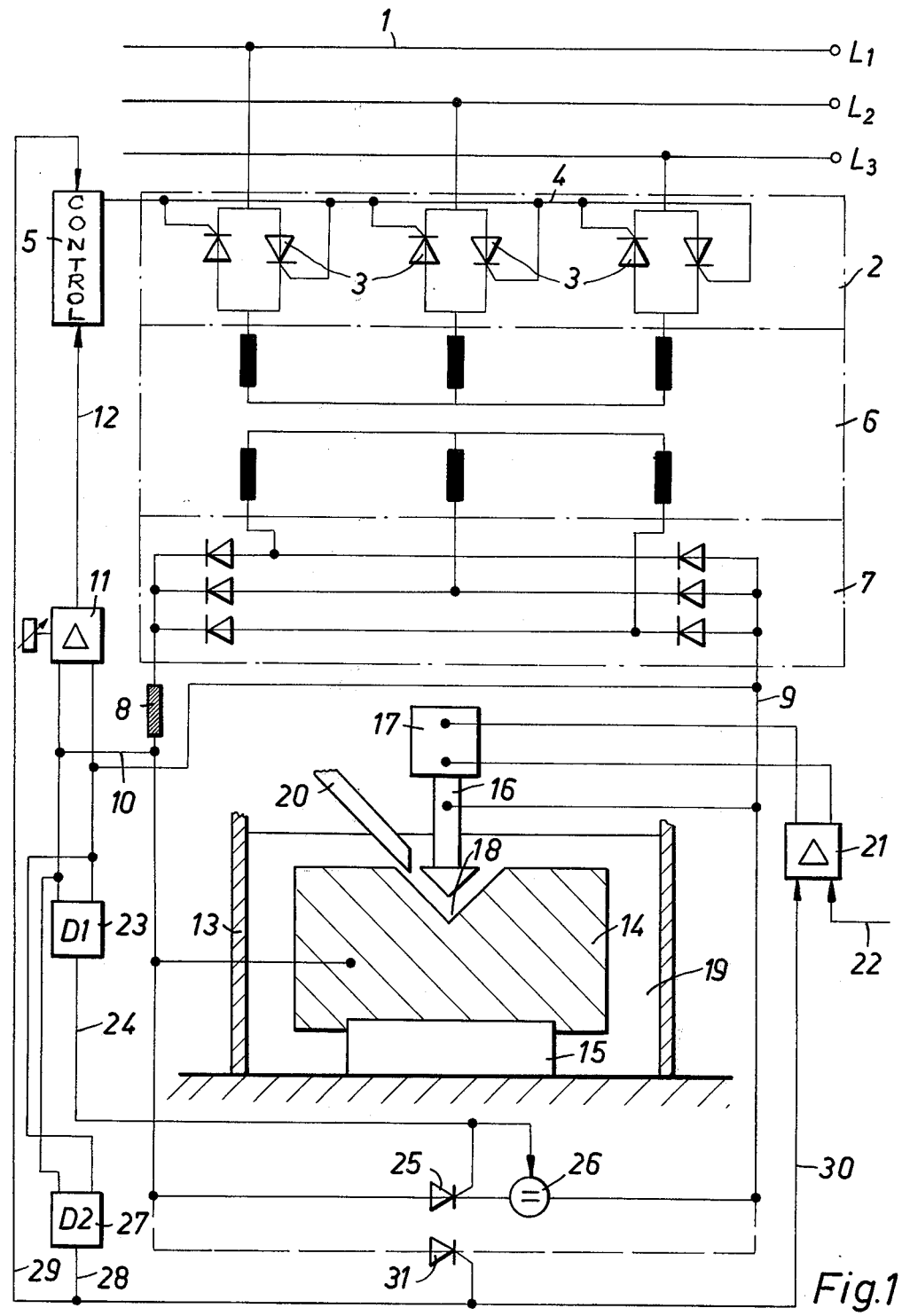
FIG. 1 shows an arrangement for carrying out the process of this invention.

In FIG. 1 a 50 Hz-three-phase current system 1 feeds a three-phase adjuster 2. Three-phase adjuster 2 consists in a known manner, of oppositely connected pairs of thyristor switches 3, the opening time of which may be controlled via control lines 4 from a control device 5. A three-phase current fed to the primary windings of a three-phase current performance transformer 6 is adjustable by means of the three-phase current adjuster 2. The flow of current through the three-phase current adjuster 2 may be turned off by means of the control device 5.

A rectifier bridge 7 is series connected to transformer 6, the starting voltage of which is fed to a d.c. network 9 containing a smoothing choke 8. The voltage of the power network 9 is fed to the inlet of an AGC amplifier 11 by means of measuring lines 10, the output signal of which is fed via line 12 to control device 5. The adjustment of control device 5 takes place by keeping the voltage of the network 9 constant under stationary operating conditions. The current which may be taken from the network 9, amounts for example, to 12,000 A at a voltage of 12 V.

Tank 13 of an electrolytic processing device serves for the processing of a metallic workpiece 14 in a support device 15. It may be for example, a turbine blade the shape of which is to be formed electrolytically. A correspondingly shaped processing electrode 16 may be adjusted by means of a hydraulic servomotor 17 as against the surface of the workpiece 14. The workpiece and the processing electrode form an operating gap 18 which is filled with a liquid electrolyte 19. The flushing of the operating gap 18 is accomplished via a pipe line 20, which feeds into the operating gap and which is fed via a pump mechanism (not shown) with the liquid electrolyte 19. Workpiece 14 and processing electrode 16 are disposed in the tank 13 which is filled with electrolyte. The arrangement may also be such that the system processing electrolyte 16—workpiece 14—operating gap 18 are closed pressure-tight against the outside and fed under pressure with the liquid electrolyte.

Workpiece 14 and processing electrode 16 are connected to the direct current network 9, so that an electrolytic operating direct current flows across the operating gap 18, and material is removed from the workpiece 14. The shaping of the workpiece 14 is accomplished by lowering the processing electrode 16 by means of the driving motor 17 into the surface of the workpiece. The adjusting speed of the driving motor 17 is controlled for this purpose in a known manner by means of an AGC amplifier 21. The AGC amplifier 21 is given a control signal for this purpose via the control line 22. The control signal of line 22 is taken from a suitable regulator (not shown).

The input of an arc detector device 23 is connected to the operating gap 18 via the measuring lines 10, which responds selectively to arcs at the operating gap 18. Short circuits, which take place on the operating gap 18 with formation of arcs, are identified by means of the detector device 23 and a corresponding control signal is connected to the line 24.

The detector device 23 consists of a device which identifies high frequency electric oscillations on the operating gap 18. For this, device 23 includes a HF filter, which feeds these oscillations, the frequency of which, for example, is above 5 kHz, to a series connected rectifier. The rectifier voltage is compared to a threshold voltage, which is adjustable, and the resulting comparison voltage which results whenever the signal voltage exceeds the adjusted threshold voltage, is used for switching the signal voltage of line 24.

The signal of line 24 connects an auxiliary direct current source 26 with the operating gap 18 via a thyristor switch 25. The auxiliary direct current source 26 produces an auxiliary direct current of temporally limited duration, the pulse-duration of which may be adjustable. The auxiliary direct current is counter to the direction of current flow of the normal operating direct current from the network 9 via the operating gap 18.

The arrangement described works as follows. In the standard stationary operation, the voltage of network 9 is held constant by means of the regulators 10, 11, 12, 5 and 2. The driving motor 17 is adjusted at constant adjusting speed against the surface of the workpiece 14 in such a way that essentially a constant width of the operating gap results, independently of the electrolytic removal from the workpiece 14. Whenever a short circuit occurs with arc formation between both workpieces, at the operating gap 18 between the processing electrode 16 and the workpiece 14, then high frequency electric oscillation becomes noticeable on the operating gap 18. This oscillation is applied to device 23 via measuring line 10. Whenever the amplitude of these HF oscillations exceeds a predetermined adjustable value a signal is switched to signal line 24 and the auxiliary direct current source 26 is connected to the operating gap 18. The pertinent auxiliary direct current is superposed in case of continuous drive of the driving motor 17 and continuous feed of the operating gap from the d.c. network 9, to the operating direct current and the ignited arc is extinguished.

After connecting the auxiliary d.c. source 26 to the operating gap 18 and the pertinent current discharge, switch 25 is closed again and the auxiliary d.c. source 26 is prepared for renewed operation.

An unsuccessful attempt of extinguishing of the arc in the operating gap, leads to a renewed temporally displaced operation of the auxiliary d.c. source.

Short circuits, which take place free of an arc, are identified by means of a detector device 27. It is also connected to the measuring line 10 and responds for example, to quick voltage drops, which occur in case of dead circuits, i.e., in case of metallic contact between processing electrode 16 and the workpiece 14. It switches a control signal, which is fed via line 29 to the control device 5 and via line 30 to the amplifier 21, to the starting line 28. The flow of current through the three-phase regulator 2 is blocked by the signal of line 29, and the driving direction of the driving motor 17 is reversed by the signal of line 30, so that the operating gap 18 is enlarged. After elimination of the cause for the short circuit and in case of occurrence of short circuits without arcs, the processing of the workpiece 14 is interrupted and the processing is continued after elimination of the cause for the short circuit.

The arrangement may also be such that in case of short circuits without arc, i.e., in case of metallic contact between workpiece and processing electrode, a short circuit switch 31 is connected parallel to the operating gap 18, which prevents damage of the workpiece and of the processing electrode by the appearance of short circuit currents by a short circuit of the operating gap. The switch 31 is closed for this purpose by the starting signal of line 30.

Figure 2:
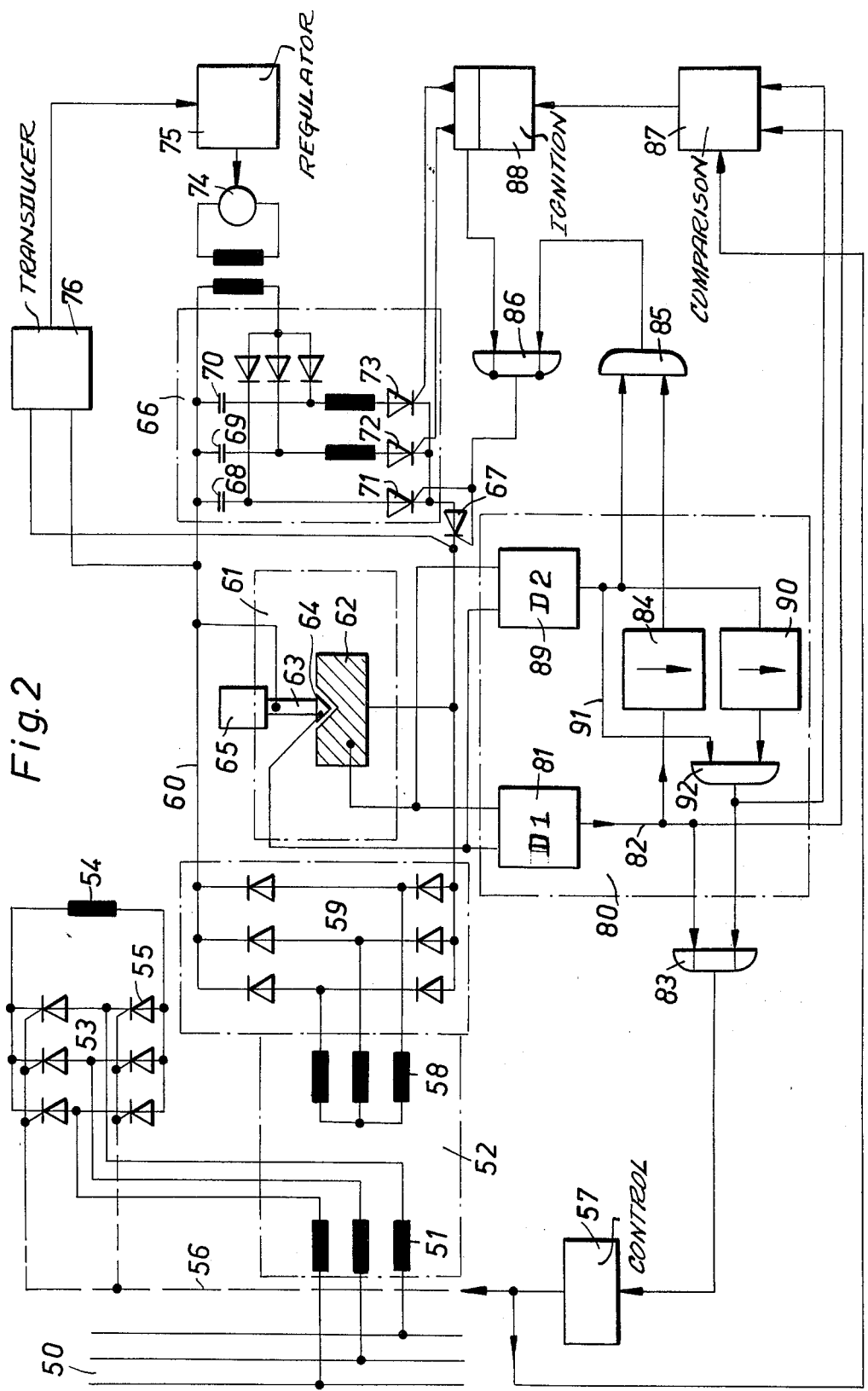
FIG. 2 shows an alternative arrangement for carrying out the process.

In FIG. 2 a three-phase current system 50 is connected with a static converter bridge circuit 53 via the open primary windings 51 of a three-phase current transformer 52. The static converter bridge circuit 53 feeds at its direct current output an inductive or smoothing choke 54. The thyristor switches 55 of the static converter bridge circuit 53 are controlled via control lines 56 from a control device 57. The control is accomplished either such that the load circuit of the static converter 53 is fed with a direct current of controllable intensity or else such that with corresponding control from the control device 57 the static converter bridge circuit 53 is converted into the inverted rectifier operation and that it feeds back into the three-phase system 50 from its load side.

The secondary windings 58 of the three-phase transformer 52 are, for example, star-connected and feed a rectifier bridge circuit 59, which feeds a d.c. system 60. The voltage of the system 60, which may be for example, between 12 ... 20 V, is regulated by means of a regulator (not shown) which is engaged with the control device 57 for the control of the a.c. intensity fed to the rectifier 59.

An electrolytic processing device 61 is connected to system 60, which serves for the mounting of a metallic workpiece 62, for example, a turbine blade, and of a processing electrode 63, adjustable in relation to the surface of the workpiece. The processing electrode 63 is adjusted by a driving motor 65, which—as described in FIG. 1—is adjusted with formation of an operating gap 64 between the processing electrode and the workpiece 62. The operating gap 64 is flushed with a liquid electrolyte which is introduced into the gap under pressure.

The auxiliary d.c. source 66, which may be connected to the operating gap 64 via a thyristor switch 67 consists of capacitors 68, 69 and 70 which may be switched in parallel via thyristor switches 71, 72 and 73. The capacitor 68 may be discharged via switch 71 directly above the operating gap 64, while an inductance is series connected to capacitor 69 and an ohmic resistor is series connected to the capacitor 70. The capacitors 68, 69 and 70 may be charged by means of a charging device 74 to a voltage, predeterminable by means of a regulator 75. The regulator is acted upon for this purpose with a measured value of the d.c. voltage measurable on the grid 60 by means of a measuring transducer 76. The regulator 75 adjusts an a.c. voltage on the charging device 74 in such a way that the capacitors 68, 69 and 70 are always charged to a voltage which is adapted to the voltage of the grid 60. It may be smaller, greater or equal to the voltage of this grid. The regulator 75 adjusts an a.c. source in the charging device 74 for this purpose, the starting voltage of which serves for charging of the capacitors via pertinent rectifiers.

A detector device 80 contains a first detector 81, which is acted upon by the d.c. voltage active at the operating gap 64. It indicates short circuits on the operating gap, which take place without formation of an arc. For this purpose, it measures, for example, the temporal course of this voltage, its drop below a lower threshold or other changes of the operating voltage, which occur in case of "dead" circuits. Whenever such circuits occur it switches a signal voltage onto the signal line 82, which is fed via a logical OR-gate 83 of the control device 57 and via a delaying device 84, a logical AND-gate 85, and a series connected logical OR-gate 86, to the thyristor switches 67 and 71 as an ignition signal. This switch closes and connects the capacitor 68 with the operating gap 64. The starting signal of line 82 is moreover fed to a comparison device 87.

The comparison device 87 checks the amplitude of the direct current and phase-position of the three-phase current which is fed to the rectifier 59 at the time of the short circuit. From the examination results the possible course of the short circuit current flowing across the operating gap 64 in case of a short circuit. The comparison device 87 switches the thyristor switches 67 and 71 as well as the thyristor switch 72 and/or 73 via a series connected ignition device 88, depending on the pertinent result of the examination. Thus auxiliary direct currents result, depending on the shape and duration of the short circuit current to be expected, across the operating gap 64, which flow across the switch 67 and which compensate at least partly the short circuit current.

A detector device 89 provides a starting signal to indicate a short circuit occurring at the operating gap 64 with arc formation. Such signal is fed via a delaying mechanism 90 and via a signal line 92 to a logical AND-gate 92, the starting signal of which is guided to the logical OR-gate 83 and the comparison device 87.

The described arrangement operates as follows. In the stationary operating state the operating electrode 63 is moved into the workpiece 62—as described in more detail on the basis of FIG. 1—with application of an operating voltage from grid 60 to the operating gap 64. The processing electrode 63, for this purpose is shifted at a predetermined speed via a regulator (not shown) against the surface of the workpiece 62. The voltage of the grid 60 is held at a constant predetermined value via a regulator (not shown).

In case a "dead" short circuit occurs between the processing electrode 63 and the workpiece 62, which takes place without formation of an arc, by metallic contact between the workpieces, the detector device 81 to provide a signal to comparison device 87 via signal line 82. The ignition device then operates thyristor switches 67 and 71 and thyristor switch 72 and/or the switch 73 via the gate 86. The mode of operation results from the amplitude and the phase position of the a.c. current fed to the rectifier device 59 at the moment of the short circuit.

At the same time the control device 57 is operated via the gate 83, which control reverses the static converter bridge circuit 53 from the rectifier operation to the invertor operation, so that electric power, stored perhaps at the outlet of the rectifier (and magnetic energy stored in choke 54) is fed back into the three-phase grid 50. The d.c. supply of the grid 60 at the same time is eliminated.

The kind of operation of the auxiliary d.c. source 66 results from the amplitude and phase position of the rectifier device 59 at the time of the short circuit, i.e., at the time of turning off the a.c. current fed to the d.c. supply of the rectifier device 59. Whenever the amplitude and phase position of this a.c. current is of such kind that a duration of the current flow is still to be expected after turning off the d.c. feed, which causes a rising and then again a decreasing short circuit current at the operating gap, then the three capacitors 68, 69 and 70 are discharged together by way of the operating gap 64. Whenever merely a drop of the short circuit current is to be expected, then—depending on the kind of the drop—the capacitors 68 and 69 or 68 and 70 are discharged.

From the superposition of the discharge currents there results a total current, the pulse shape and duration of which is selectable by suitable parallel connection of the capacitors.

Whenever a short circuit with arc formation occurs, then the detector device 89, which for example, again detects HF oscillations at the operating gap, connects the capacitor 68 with the operating gap 64 via the gates 85 and 86. The corresponding arc is extinguished. At the same time the feed of the operating gap from the d.c. grid 60 and the drive of the processing electrode are continued by means of the driving motor 65. Whenever the attempt at extinguishing is futile, then the control device 57 is operated via the logical AND-gate 92, as in the case of a "dead" circuit, and the operation is interrupted by triggering the auxiliary d.c. source from the comparison mechanism 87 with discharge of the auxiliary d.c. source 66 via the operating gap 64.

It is within the scope of the invention to develop electrolytic metal processing mechanisms of the present type perhaps in such a way that—as shown for example, in FIG. 2—an auxiliary d.c. source 66 is connected in parallel to the operating gap 64, which connects in case of a short circuit the auxiliary d.c. source 66 in parallel to the operating gap 64 via a detector device 80, disregarding any differentiation between short circuits which form an arc and such short circuits which form no arc, and then eliminates the constant voltage feed via the grid 60. The servomotor 65 is then moved back into a short circuit position in the customary manner.

The process as in the invention is used for electrolytic processing of metallic workpieces by sinking of a processing electrode into the workpiece. It may be used everywhere, where short circuits between the workpieces to be processed are to be expected and operating inaccuracies and damage are to be expected.

Many changes and modifications in the above-described embodiment can be carried out without departing from the scope of the claims. Accordingly, that scope is intended to be limited only by the scope of the appended claims.

What is claimed is:

1. A process for electrolytic processing of a metallic workpiece comprising the steps of:
applying a direct current voltage to an operating gap between the workpiece and a processing electrode to produce an operating direct current,
advancing said electrode by a driving motor against the surface of said workpiece to remove material,
supplying electrolyte to said gap,
detecting a short circuit producing an arc in said gap, and
extinguishing said arc without reversing said motor by causing, upon detecting of said short circuit, an auxiliary d.c. current of temporally limited duration to flow in said gap, the auxiliary current being in a direction counter to the direction of flow of said operating direct current to thereby cancel and extinguish any short circuit current.

2. A process as in claim 1 including the further steps of:
  detecting a short circuit in said gap which does not produce an arc,
  interrupting the operating direct current upon detecting a short circuit in said gap which does not produce an arc, and
  reversing the direction of movement of said electrode upon detecting a short circuit in said gap which does not produce an arc.

3. A process as in claim 2 including the further step of closing a short circuit switch connected in parallel with said gap upon detecting a short circuit in said gap which does not produce an arc.

4. A process as in claim 2 including the further step of supplying to said gap upon detecting a short circuit in said gap which does not produce an arc by supplying an auxiliary d.c. current of temporally limited duration and counter to the direction of flow of said operating direct current.

5. A process as in claim 1 or 2 wherein said step of detecting a short circuit which produces an arc includes detecting high frequency oscillations.

6. A process as in claim 1 or 2 wherein said step of extinguishing includes the steps of:
  charging a plurality of parallel connected capacitors to a voltage related to the voltage of said gap, and
  discharging at least one of said capacitors.

7. An apparatus for ending a short circuit in an operating gap of an electrolytic processing machine in which an electrode is advanced toward the surface of a workpiece while a d.c. current voltage is applied to the gap to produce a d.c. operating current and remove material from said surface comprising:
  means for detecting a short circuit producing an arc in said gap, and
  means connected to said detecting means for causing, upon detection of said short circuit, an auxiliary d.c. current of temporally limited duration to flow in said gap, the auxiliary current being in a direction counter to the direction of flow of said operating current to thereby cancel and extinguish any short circuit current.

8. An apparatus for electrolytic processing of a metallic workpiece comprising:
  an electrode,
  means for moving said workpiece in an operating gap toward and away from a surface of said workpiece,
  means for applying a d.c. voltage to said gap to produce a d.c. operating current and remove material from said surface,
  means for detecting a short circuit producing an arc in said gap, and
  means connected to said detecting means for causing, upon detection of said short circuit, an auxiliary d.c. current of temporally limited duration to flow in said gap, the auxiliary current being in a direction counter to the direction of flow of said operating current to thereby cancel and extinguish any short circuit current.

9. An apparatus as in claim 7 or 8 wherein said detecting means includes means for detecting high frequency oscillations.

10. An apparatus as in claim 7 or 8 further including
  further means for detecting a short circuit in said gap which does not produce an arc,
  means for interrupting the operating direct current in said gap upon detecting a short circuit which does not produce an arc, and
  means for reversing the direction of movement of said electrode upon detecting a short circuit which does not produce an arc.

11. An apparatus as in claim 10 further including a short circuit switch means connected in parallel with said gap and to said further means for closing when a short circuit is detected which does not produce an arc.

12. An apparatus as in claim 7 or 8 further including means for supplying liquid electrolyte to said gap.

13. An apparatus as in claim 7 or 8 wherein said detecting means includes a plurality of parallel connected capacitors, and means for charging said capacitors said supplying means includes for discharging at least one of said capacitors.

14. An apparatus as in claim 13 wherein said charging means includes means for detecting the voltage across said gap and charging said capacitors in accordance therewith.

15. An apparatus as in claim 14 further including
  further means for detecting a short circuit in said gap which does not produce an arc,
  means for interrupting the operating direct current in said gap upon detecting a short circuit which does not produce an arc, and
  means for reversing the direction of movement of said electrode upon detecting a short circuit which does not produce an arc.

16. An apparatus as in claim 15 further including logic means connected to each of said detecting means for discharging said capacitors.

* * * * *